United States Patent [19]

Sterki

[11] Patent Number: 4,532,715
[45] Date of Patent: Aug. 6, 1985

[54] INSPECTION MACHINE AND METHOD FOR MEASURING THE CIRCULAR PITCH SPACING OF TEETH ON A MEASUREMENT CIRCLE OF A GEAR

[75] Inventor: Armin Sterki, Uetikon, Switzerland
[73] Assignee: Maag Gear-Wheel & Machine Company, Ltd., Zurich, Switzerland
[21] Appl. No.: 583,972
[22] Filed: Feb. 27, 1984
[30] Foreign Application Priority Data
Mar. 7, 1983 [CH] Switzerland ............ 1222/83
[51] Int. Cl.³ ............................................. G01B 7/28
[52] U.S. Cl. ............................................. 33/179.5 R
[58] Field of Search .............. 33/179.5 R, 179.5 E, 33/179.5 D, 174 P, 174 L

[56] References Cited
U.S. PATENT DOCUMENTS
4,297,788 11/1981 Sterki et al. ............ 33/179.5 D X

*Primary Examiner*—Harry N. Haroian
*Attorney, Agent, or Firm*—Werner W. Kleeman FOREIGN PATENT DOCUMENTS
1183700 12/1964 Fed. Rep. of Germany

[57] ABSTRACT

The inspection or measuring machine is suitable for measuring the circular pitch spacing of teeth on gears of large diameter since the measurement results are not negatively influenced by the finite resolution of the graduations of the angular displacement sensing means. The signal pulses $\phi_i$ delivered by the angular displacement sensing means are input into a control processor together with a value $r_i$ of the current measuring radius delivered by a linear displacement measuring system. The control processor computes a corresponding arc-length b therefrom. The path distance $T_s(X)$ corresponding to the deflection of the measurement sensing feeler is measured from the beginning of a linear region of response of the measurement sensing means as recognized by a range comparator. A logic gate initiates the computation of the true arc-length B on the measurement-circle from the calculated arc-length b and the measured path length $T_s$ at a subsequent pulse of the angular displacement sensing means and further computes therefrom the pitch spacing of the gear.

8 Claims, 3 Drawing Figures

INSPECTION MACHINE AND METHOD FOR MEASURING THE CIRCULAR PITCH SPACING OF TEETH ON A MEASUREMENT CIRCLE OF A GEAR

BACKGROUND OF THE INVENTION

The present invention broadly relates to gear pitch testing machines and, more specifically, pertains to a new and improved construction of and method of employing an inspection or measuring machine for measuring the circular pitch spacing of teeth on a gear.

Generally speaking, the inspection or measuring machine of the present invention for measuring the circular pitch spacing of teeth on a measurement-circle of a gear comprises a measurement sensor having a mechanically pre-loadable feeler or contact arm capable of being deflected by a flank of a tooth of the gear being measured, having an active sensing range with a range of linear response and generating an output signal defining a linear measurement value; a first transport carriage translatably drivable in a direction substantially radial to the gear for mounting the measurement sensor; drive means for rotating the gear; angular displacement sensing means capable of being operatively connected to the gear; wherein the angular displacement sensing means generates a pulse signal when the measurement sensor enters its range of linear response; and a control processor is connected to the angular displacement sensing means for controlling measurement operations and for computing measurement values.

The method of inspection of the present invention measures the circular pitch spacing of teeth on a measurement-circle of a gear by means of a measurement-sensing means or sensor having a feeler or contact arm capable of being deflected by a flank of a tooth of the gear being measured and having a range of linear response and being translatable at least in a direction substantially radial to the gear and having an inherent systematic error factor and by means of an angular displacement sensing means generating signal pulses corresponding to an angular displacement of the gear.

An inspection machine of this type in which the gear being measured turns continuously is known from the German Pat. No. 3,125,929 granted Mar. 24, 1983. This known inspection machine is only suitable for the measurement of internal and external gear teeth of small gears, since the measurement becomes increasingly inaccurate as the radius of the measurement-circle increases due to the limited resolution of the angular displacement sensing means. Although the angular displacement sensing means of this known device employs a graduated scale of the highest possible resolution and each line of graduation generates a signal pulse, if the diameter of the gear to be tested is considerably greater than the diameter of the angular displacement sensing means, motions of the measurement sensing feeler or contact arm can take place between two such graduation lines and therefore not be measured since the counters of the inspection machine only employ a count of pulses generated by the graduation lines for determining the angular displacement measurement value.

The following equation defines the measurement-uncertainty of this known device in relation to the measurement radius r:

$$U_r = \underbrace{\frac{t_s}{2} \cdot \frac{r}{r_w}}_{A} + \underbrace{\left( \sigma_a + \underbrace{\frac{\phi_i}{2\pi \cdot K}}_{E} \right) \cdot r}_{B} \text{ (mm arc-length)}$$

where:

$t_s$ is the spacing of the graduation lines in millimeters of arc-length;

$r$ is the measuring radius in millimeters;

$r_w$ is the radius of the graduated circular disc of the angular displacement sensing means in millimeters;

$\sigma_a$ is the sensing-uncertainty of the graduation line spacing and random errors of the mechanical components in radians (independent of the angular displacement sensing means, of the method of sensing the same and of the mechanism devoted to measuring angular displacement);

$\phi_i$ is the angular displacement in radians;

$K$ is a constant factor or coefficient (dependent upon the measurement sensing means and upon the rotary work table upon which the gear is mounted) (dimensionless).

The total measurement-uncertainty $U_r$ is composed of the random errors A and B as well as the systematic error E. All of these errors increase linearly with the measurement radius r.

SUMMARY OF THE INVENTION

Therefore, with the foregoing in mind it is a primary object of the present invention to provide a new and improved construction of an inspection machine and a method of using the same for measuring the circular pitch spacing of gear teeth which do not have associated with them the aforementioned drawbacks and shortcomings of the prior art constructions and methods.

Another and more specific object of the present invention aims at providing a new and improved construction of an inspection machine of the previously mentioned type and a new and improved method of measuring the pitch spacing of gear teeth in which the total measurement-uncertainty $U_r$ is reduced by eliminating the error components A and E.

Yet a further significant object of the present invention aims at providing a new and improved construction of an inspection machine of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the inspection machine of the present invention is manifested by the features that:

the measurement-circle of the gear has a radius $r_i$;

a radius measuring system is operatively associated with the first transport carriage for measuring a set of predetermined value of the radius $r_i$;

a multiplier circuit or unit is operatively connected to the radius measuring system for generating a measurement value b;

an angular displacement correction circuit or unit is operatively connected to the multiplier circuit or unit and has a chip-select or control input terminal;

a storage flip/flop is operatively connected between the angular displacement correction unit and the angular displacement sensing means and has a chip-select or control input terminal;

an analog-to-digital conversion unit is operatively connected between the measurement sensor and the control processor and generates a measurement value $T_s$ and has a chip-select or control input terminal and a signal output terminal;

a logic gate has an enable signal input terminal operatively connected to the control processor, a signal input terminal operatively connected to the angular displacement sensing means and a signal output terminal commonly operatively connected to the chip-select or control input terminals of the analog-to-digital conversion unit, the storage flip/flop and the angular displacement correction unit for latching the angular measurement value $\phi_i$ of the angular displacement sensing means into the storage flip/flop and the linear measurement value $T_s$ of the measurement sensor into the analog-to-digital conversion unit and for initiating an angular displacement correction operation in the angular displacement correction unit upon arrival of the pulse signal $\phi_i$ defining said angular measurement value;

a range comparator unit is provided for the measurement sensor and responds to the output signal of the measurement sensor defining the linear measurement value when the measurement sensor enters the range of linear response and is operatively connected to the chip-select or contact input terminal of the logic gate, the analog-to-digital conversion unit and to the measurement sensor; and an adder circuit is provided in the control processor and is operatively connected to the output terminals of the analog-to-digital conversion unit and of the multiplier unit for performing an algebraic addition of the linear measurement value $T_s$ supplied by the analog-to-digital conversion unit and the measurement value b supplied by the multiplier unit to determine a true acuate distance between two measurement points on the measurement-circle of the gear and to determine therefrom the circular pitch spacing of the gear.

The inspection method of the present invention is manifested by the steps of:

counting signal pulses corresponding to the angular displacement of the gear at least while the feeler is being deflected by a tooth of the gear;

storing the corresponding angular displacement measurement values $\phi_i$;

measuring the distance $T_s$ corresponding to a deflection of the feeler between a point where the measurement sensor enters the range of linear response and a point attained when a subsequent pulse of said signal arrives;

computing a corrected value $\phi$ of angular displacement of the gear corresponding to one of the measured and stored angular displacement values $\phi_i$ as corrected by the systematic error factor E to define such corrected value $\phi$;

converting the corrected value $\phi$ into an arc-length b corresponding to the angular displacement of the gear in dependency of the radius $r_i$ of the measurement-circle of the gear; and computing a true arc-length B on the measurement circle for determining the circular pitch spacing of the gear from the arc-length B and the feeler deflection $T_s$.

The inspection machine and method according to the invention result in an irreducible measurement uncertainty $U_{95}$ (i.e. a measurement-uncertainty for 95% of the measurement values at the measurement radius r) of:

$$U_{95} = \sigma_a \cdot r \text{ (mm of arc-length)}$$

In the inspection machine and method according to the invention, the measurement of the angular displacement value $\phi_i$ takes place at the exact increment edges of the graduation scale and is therefore a discrete count measurement. $\phi_i$ is subsequently corrected in the control processor by the amount of the inherent systematic error E. The arc-length b is determined from the exact, correct, value of angular displacement and the supplementarily measured measurement-circle radius $r_i$. In addition, the analog motion $T_s$ of the measurement sensing feeler within a division or counting interval of the graduated scale is determined and the true arc-length B on the measurement-circle is computed from the two values b and $T_s$ as the pitch spacing. The influence of the resolution of the graduated scale and the relation of the measurement-circle radius of the gear to the radius of the angular displacement sensing means upon the measurement-uncertainty is therefore eliminated by means of the fine resolution or interpolation performed by the measurement sensing means and the random error A is thereby removed.

The systematic error is also eliminated by correcting $\phi_i$ by the amount E. In practice this is accomplished by testing every inspection machine and its associated rotary work table by means of a calibrated angular displacement measurement device (e.g. an optical polygon with photoelectric autocollimator) and storing the systematic errors determined from such measurements in a correction or calibration table. A suitable correction or calibration table has the following appearance:

| $\phi_i$ | E |
| --- | --- |
| $\phi_0$ | $E_o$ |
| $\phi_n$ | $E_n$ |
| $\phi_{2\pi}$ | $E_{2\pi}$ |

It will be seen that for each angular position $\phi_i$ there is a correction value E. The correction table is stored in the memory of the associated control processor of the inspection machine. The measurement of even very large gears is thereby made independent of the resolution of the division of the graduated scale.

A further embodiment of the inspection machine according to the invention is particularly well suited for automatic measurement operations, since the measurement-circle radius r, once adjusted with the first transport carriage, is preserved and a further transport carriage moves the measurement sensing feeler in a measurement stroke out of one gear tooth space and into the next up to the measurement-circle again. The motion of the further transport carriage is also controlled by the control processor, which may be provided with a suitable control program for this purpose.

According to a further embodiment of the invention, additional measurement-circles can be defined at different positions in the width of the gear teeth, for which purpose a third transport carriage can also be controlled by the control processor.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures of the drawings there have been generally used the same reference characters to denote the same or analogous components and wherein.

DETAILED DESCRIPTION OF THE PREFERRED EMBODIMENTS

Describing now the drawings, it is to be understood that in order to simplify the illustration thereof only enough of the construction of the invention has been shown as needed for those skilled in the art to readily understand the underlying principles and concepts of the present development.

Figure 1:
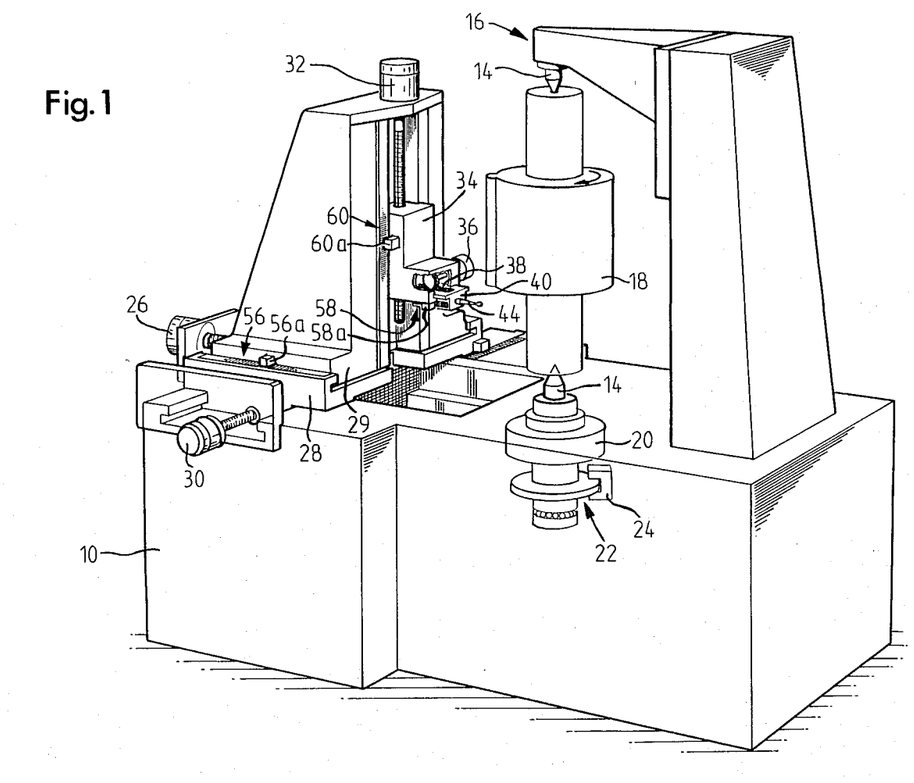
FIG. 1 schematically illustrates a gear inspection machine suitable for checking the circular pitch spacing of gear teeth by means of an apparatus according to the invention.

Turning attention now to the drawings, FIG. 1 shows a gear inspection machine 10 in which a gear 18 is mounted between conical supports or centers 14 respectively provided in a rotary drive mechanism 20 and in a counter-support arm 16. The lower center 14 can in practice be replaced by a rotary work table or chuck or the like for conveniently mounting a gear to be inspected (as is symbolically represented in FIG. 3), thus allowing the gear to be firmly held. The gear 18 to be measured is symbolically represented in FIG. 3 as a cylinder having a single tooth. An angular displacement measurement sensor 22 is mounted together with the rotary drive mechanism 20 below the lower center 14.

The angular displacement sensor 22 comprises a circular disc or cylinder with graduation lines. The graduated lines of the disc are sensed at their increment edges by a sensing head 24 which generates a pulse signal for each graduation line.

A tangential or X-axis transport carriage 28 is arranged on the gear inspection machine 10 to be drivable in the direction of an X-axis by means of an X-axis drive 30. The X-axis transport carriage 28 carries a radial or Y-axis transport carriage 29 drivable in the direction of a Y-axis by means of a Y-axis drive 26. The Y-axis transport carriage 29, in turn, carries a vertical or Z-axis transport carriage 34 drivable in the direction of a Z-axis by means of a Z-axis drive 32. Finally, the Z-axis transport carriage 34 carries a sensing or H-axis transport carriage 38 drivable in a direction substantially radial to the gear 18 to be inspected by means of a H-axis drive 36. The Y-axis transport carriage 29 and the H-axis transport carriage 38 therefore move in substantially parallel directions. In the exemplary embodiment of the invention shown in FIG. 1, the axis of rotation of the gear is essentially vertical, with corresponding orientations of the X, Y, Z and H-axes. It will be understood that other orientation of the gear and the machine components are possible.

A measurement sensor 40 is mounted on the H-axis transport carriage 38. The measurement sensor 40 has a measurement sensing feeler 44 which can be deflected or caused to pivot by a tooth flank 42 of the gear 18 being inspected. In the exemplary embodiment illustrated in the Figures of the drawings, the feeler 44 is provided with a ball contact or tip.

All of the aforementioned drive means are rotary drives, each driving its associated transport carriage by means of a spindle actuated by a motor MO and provided with a revolution counter transducer or tachometer-generator TG for the exact control of the motion of the corresponding transport carriage. The Y-axis and Z-axis drives are further provided with a braking mechanism BR by means of which a uniquely adjusted transport carriage position can be fixed. The X-axis drive may also be provided with such a braking mechanism if desired.

Figure 3:
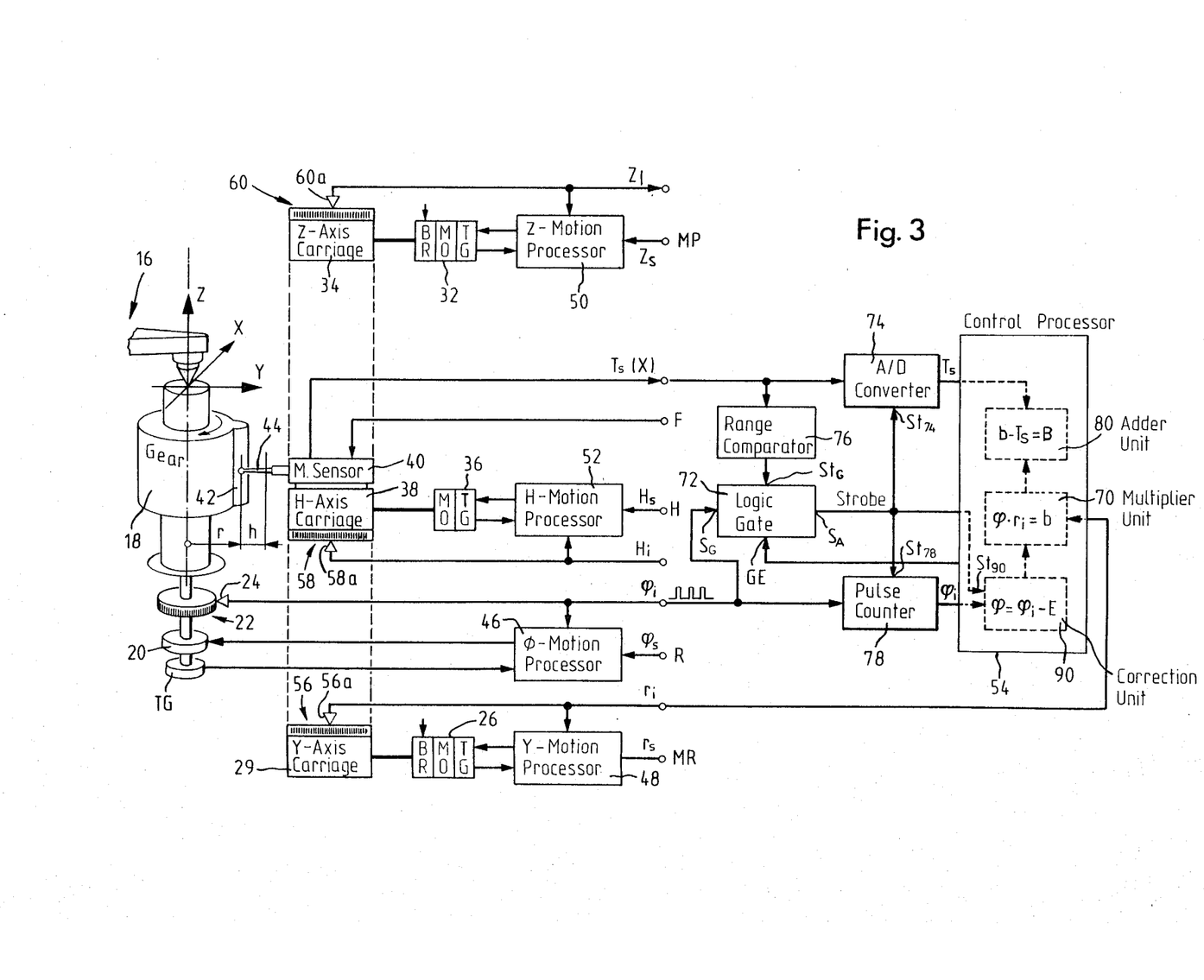
FIG. 3 is a schematic diagram of the arrangement of the measuring components.

The drives 20, 26, 30 (to simplify the showing of the drawings, the X-axis drive is not shown in FIG. 3), 32 and 36 each have an associated linear displacement processor as shown in FIG. 3. These are an angular displacement $\phi$ processor 46, a Y-axis linear displacement processor 48, a Z-axis linear displacement processor 50 and an H-axis linear displacement processor 52. The angular displacement $\phi$ processor 46 is incorporated in a channel or circuit R for controlling the rotation of the gear 18 being inspected. The Y-axis linear displacement processor 48 is incorporated in a channel or circuit MR for controlling the measurement radius. The H-axis linear displacement processor 52 is incorporated in a channel or circuit H for controlling the measurement stroke position in a direction substantially radial to the gear being inspected. The Z-axis linear displacement processor 50 is incorporated in a channel or circuit MP for controlling the measurement position on the Z-axis, i.e. in the width of the gear teeth.

A reference or prescribed value $r_s$ of the measurement radius r is input into the channel or circuit MR either by hand or by a control processor 54. A reference value $\phi_s$ of the angular displacement $\phi$ is input into the channel or circuit R, a reference value $H_s$ of the measurement stroke position is input into the channel or circuit H and a reference value $Z_s$ of the measurement position is input into the channel or circuit MP in an analogous manner.

Respective linear displacement measuring systems 56, 58 and 60 are associated with the transport carriages 29, 34 and 38. These linear displacement measuring systems are represented in FIG. 3 by line-graduated scales (e.g. a transparent scale) fixed to the corresponding transport carriages and each sensed by a respective sensing head 56a, 58a and 60a. These sensing heads supply the current actual values of the corresponding parameters (identified by the index i in the drawings). These actual values are employed by their respective linear displacement processors to accurately regulate the parameters defined by the reference values. The actual values can be further employed in the control processor 54 (for the sake of clarity, corresponding connections, in as far as they are not significant for the invention, have not been shown in FIG. 3).

The output of the radius-measurement system 56 is connected to an input of a multiplier unit 70 realized in the control processor 54 by hardware or software means. A further input of the multiplier unit 70 is connected to the output of a correction unit 90 realized in the control processor 54 by hardware or software means. The output of the angular displacement measurement sensor 22 is connected to the signal input of a storage flip/flop 78 functioning as a pulse counter and storage buffer and also to a signal input $S_G$ of a logic gate 72. The signal output of the measurement sensor 40 mounted on the H-axis transport carriage 38 is connected to the signal input of an analog-to-digital conversion unit 74 and the signal input of a range comparator 76. The output of the range comparator 76 is connected to the chip-select input $St_G$ of the logic gate 72. The logic gate 72 also has a gate enable input GE connected to an output of the control processor 54. The logic gate 72 has a further signal output SA commonly connected to a chip-select or control input $St_{74}$ of the analog-to-digital conversion unit 74, to a chip-select or control input $St_{78}$ of the storage flip/flop 78 and to a chip-select or control input $St_{90}$ of the correction unit 90. The signal output of the storage flip/flop 78 is connected to the input of the correction unit 90. The output of the analog-to-digital conversion unit 74 is connected to a summing or adder unit 80 realized in the control processor 54 by hardware or software means.

In practice an interface circuit would be arranged between the control processor 54 and the remaining circuitry shown external thereto in FIG. 3. Such interface is not shown in the drawings for reasons of representational simplification.

The measurement sensing feeler 44 employed in the measurement sensor 40 is mechanically pre-loaded to the left or to the right according to the handedness of the gear tooth flanks to be sensed. The mechanical pre-loading to be exerted on the sensing feeler 44 is prescribed through a channel or lead F, as is its direction according to whether the tooth flanks to be sensed are left-hand or right-hand flanks. As the sensing feeler 44 is deflected by a tooth flank, it reaches, after a certain amount of deflection, a linear measurement or response range of the measuring sensor 40 which is recognized by the range comparator 76.

Figure 2:
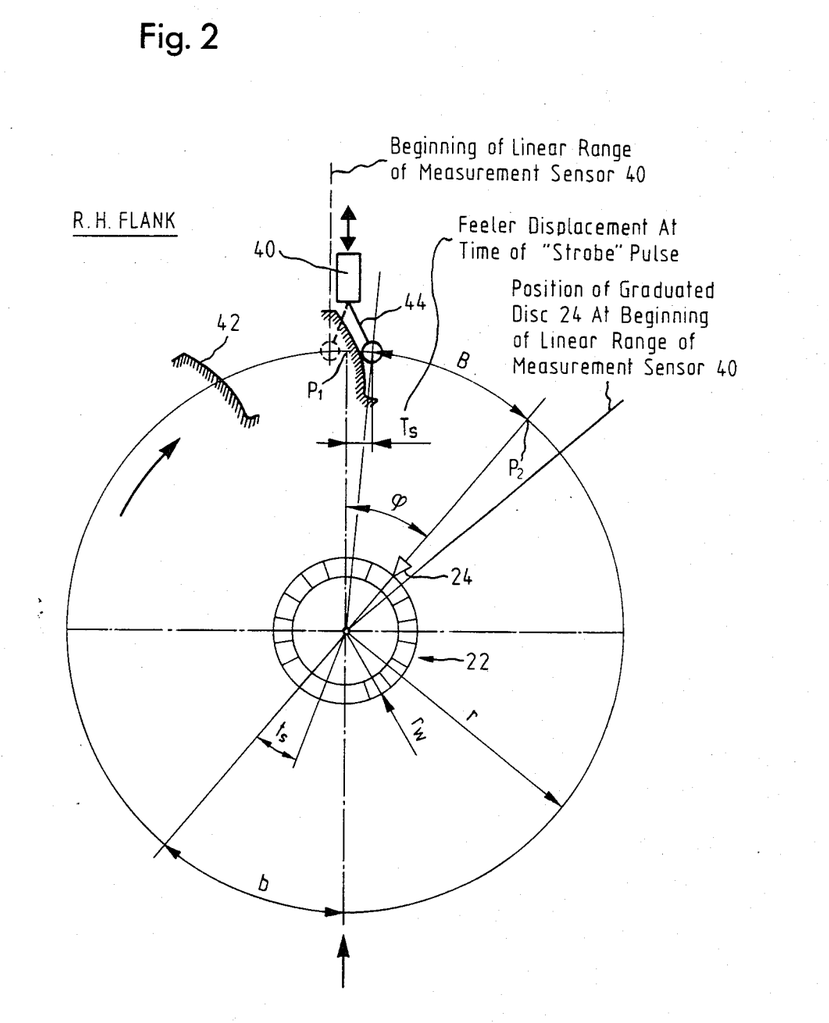
FIG. 2 schematically illustrates a plan view of the measurement organs of the inspection machine.

FIG. 2 shows the measurement sensor 40 with its sensing feeler 44 pre-loaded to the left for measuring the pitch spacing of a gear rotating clockwise on its right-hand tooth flanks 42. Before the gear tooth flank 42 touches the ball tip of the sensing feeler 44, the tip is in a position somewhat further to the left than the position shown in broken line in FIG. 2. As shown in FIG. 2, the gear tooth flanks 42 are rotating in a clockwise direction to enter into contact with the ball tip from the left and to deflect it in a clockwise or rightward direction.

When the ball tip of the feeler 44 reaches the position shown in broken line, it is at the beginning of the linear range of the measurement sensor 40 which is recognized by the range comparator 76 as will be described in more detail below. The elapsed travel from this position to a position where the next line of the graduated scale of the angular displacement sensing means 22 is sensed (represented in FIG. 2 in line with the point $P_1$) corresponds to the deflection $T_s$ of the feeler 44.

The method of operation of the inspection machine will now be described in reference to the Figures. The control processor 54 contains a control program by means of which the measurement operation and the processing of the measurement values are controlled on the basis of the data input into the control processor.

After the gear 18 to be inspected has been mounted in the inspection or measuring machine, the sensing feeler 44, under the control of the control processor 54, is brought tangentially into the initial measurement position by means of the X-axis transport carriage 28. In this initial measurement position the sensing feeler 44 is aligned with a first space between teeth of the gear. The Y-axis transport carriage 29 transports the measurement sensor 40 radially toward this tooth space up to a position where the ball tip of the feeler 44 would be at the measurement circle in the forward position of its measurement stroke h.

The sensing feeler 44 of the measurement sensor 40 is, however, still located outside the periphery of the gear to be inspected, since the H-axis transport carriage 38 is positioned at the right-hand or outer limit of the measurement stroke h shown in FIG. 3. In other words, the measurement stroke has not yet been carried out.

The measurement sensor 40 is adjusted to the desired height of the measurement position in the width of the gear by means of the Z-axis transport carriage 34. The H-axis transport carriage 38 now executes the measurement stroke h, moving the measurement sensor 40 and with it the ball tip of the sensing feeler 44 into the measurement position on the measurement-circle. Simultaneously, the rotation of the gear 18 to be inspected is initiated either manually or by a control program in the control processor 54. The gear tooth flank 42 contacts and deflects the sensing feeler 44. The measurement sensor 40 continuously transmits a signal $T_s(X)$ corresponding to the current degree of deflection of the sensing feeler 44 to the range comparator 76 and to the analog-to-digital conversion unit 74.

Simultaneously with the rotation of the gear 18, the angular displacement sensor 22 begins to transmit signal pulses $\phi_i$ to the pulse-counting storage flip/flop 78. Additionally, the control processor 54 applies an enable signal to the enable input GE of the logic gate 72. However, The logic gate remains blocked and can only be activated by a chip-select or control signal from the range comparator 76. As long as the sensing feeler 44 has not yet attained a certain deflected position (i.e. remains to the left of the position of the ball tip represented in broken line in FIG. 2), the sensing feeler 44 is in the non-linear range of the sensor 40. When that certain deflected position is attained, the range comparator 76 recognizes that the sensing feeler 44 is at the beginning of the linear range and activates the logic gate 72 by means of a signal transmitted to the chip-select input or control terminal $St_G$.

After the logic gate 72 has been activated by the range comparator 76, it generates a sensing signal STROBE when a subsequent pulse signal $\phi$ arrives from the angular displacement sensor 22 and applies it to the chip-select input or control terminal $St_{74}$ of the analog-to-digital conversion unit 74, the chip-select input or control terminal $St_{78}$ of the storage flip/flop 78 and the chip-select input or control terminal $St_{90}$ of the correction unit 90. This causes the currently valid measurement values $\phi_i$ and $T_s$ to be latched into the corresponding circuitry and to be presented to the control processor 54 for further processing. In combination, these two values permit an interpolated or fine-resolution measurement of the angular displacement or position of the gear. In particular, $T_s$ represents the amount of deflection of the feeler 44 from a reference position to the position it attains when the subsequent graduation line of the graduated disc 22 is sensed by the angular displacement sensing means 24. The reference position may be defined anywhere within the linear range of response of the sensor 40 and is preferably a position in the middle of this range corresponding to a zero-crossing or zero value of the signal $T_s(X)$ being continuously transmitted by the sensor 40. It also causes the corrected angular value $\phi$ to be formed by the correction unit 90 by correcting the angular displacement measurement value $\phi_i$ by the amount of the systematic error E associated with this particular angular position.

The systematic errors E take the form of definite values having unique algebraic signs and are arbitrarily reproducible. As already mentioned, this permits machine-related measurement series in the form of calibrating or correction values associated with absolute angular values to be determined and stored in the corresponding memory register of the control processor of the associated inspection machine. By applying the corrections or calibration factors in determining the desired circular pitch spacing, the measurement uncertainty at each measurement point can be reduced to practically its random error component.

Then the control processor 54 blocks the logic gate 72 by removing the gate enable signal from the gate enable input terminal GE and the H-axis transport carriage 38 is retracted to the right-hand limit of the measurement stroke h shown in FIG. 3. As soon as the still continuously rotating gear 18 has reached the next predetermined angular position, the sensing feeler 44 is advanced into the next gear tooth space. The control processor 54 reapplies the gate enable signal to the input terminal GE of the logic gate 72 and the next measurement can be executed in the same manner.

From the corrected values of angular displacement and the associated radius $r_i$ of the measurement-circle, the multiplier unit 70 determines the arc-length b corresponding to the integral number of intervals of the graduated disc 22 having passed the angular displacement sensing means 24 between the two subsequent angular measurement positions of the gear. The deflection $T_s$ or the feeler 44 corresponds to the fractional or interpolative portion of a single interval between two adjacent graduations of the disc 22 also having passed by the angular displacement sensing means 22 and representing a component of the pitch spacing being measured. This fractional or interpolative portion of such an interval lies below the limit of resolution of the graduations and therefore cannot be sensed by the angular displacement serving means 24.

The adder unit 80 in the control processor 54 sums the values b and $T_s$ algebraically in order to determine the true arc-length B on the measurement-circle as a pitch spacing. In the example shown, the linear displacement $T_s$ corresponding to the deflection of the sensing feeler 44 within the linear range of the measurement sensor 40 has a negative sign and must therefore be subtracted from the arc-length b (the arc-length between the points $P_1$ and $P_2$ in FIG. 2).

The measurement values determined in the first gear tooth space can be employed as reference values for all further measurements, i.e. all subsequent measurements can be corrected by the amount of the measurement values determined in the first gear tooth space. Thus, this method of measurement eliminates the measurement uncertainty due to the finite resolution of the angular displacement sensor.

In a practically executed example, displacement processors corresponding to those explicitly described in the U.S. patent application No. 06/437,091, filed Mar. 7, 1983, were employed in an inspection machine according to the present invention as the displacement processors 46, 48, 50 and 52. Additionally, the following circuit components were employed:

| Reference Numeral | Designation | Type/Manufacturer |
|---|---|---|
| 40 | measurement sensor | LMT/MAAG |
| 56, 58, 60 | displacement measurement system | MINILID/HEIDENHAIN |
| 22 | angular displacement sensor | ROD-800/HEIDENHAIN |
| 70 | multiplier circuit | ISBC 337/INTEL |
| 72 | logic gate | TTL-Logic/TEXAS INSTRUMENTS |
| 74 | A/D-converter | ISBX 311/INTEL |
| 76 | range comparator | Operational Amplifier-Voltage Comparator/Fairchild + TTL-Logic/TEXAS INSTRUMENTS |
| 78 | storage flip/flop | 25 LS 193 Up-Down Counter + AM 2920 Octal Flip-Flop/ ADVANCED MICRO DEVICES |
| 54 | control processor | SBS 86/14/INTEL |

While there are shown and described present preferred embodiments of the invention, it is to be distinctly understood that the invention is not limited thereto, but may be otherwise variously embodied and practiced within the scope of the following claims. Accordingly,

What I claim is:

1. An inspection machine for measuring the circular pitch spacing of teeth on a measurement-circle of a gear, comprising:

a measurement sensor having a pre-loadable feeler capable of being deflected by a flank of a tooth of the gear being measured, having an active sensing range with a range of linear response and generating an output signal defining a linear measurement value;

a first transport carriage translatably drivable in a direction substantially radial to the gear for mounting said measurement sensor;

rotary drive means for angularly displacing the gear;

angular displacement sensing means capable of being operatively connected to the gear and generating a pulse signal defining an angular measurement value when said measurement sensor enters said range of linear response;

a control processor connected to said angular displacement sensing means for controlling measurement operations and for computing measurement values;

said measurement-circle of the gear having a radius;

a radius measuring system operatively associated with said first transport carriage for measuring a set value of said radius;

a multiplier unit operatively connected to said radius measuring system for generating a measurement value;

said multiplier unit having an output terminal;

an angular displacement correction unit operatively connected to said multiplier unit and having a chip-select input terminal;

a storage flip/flop operatively connected between said angular displacement correction unit and said angular displacement sensing means and having a chip-select input terminal;

an analog-to-digital conversion unit operatively connected between said measurement sensor and said control processor for generating a measurement value and having a chip-select input terminal;

said analog-to-digital conversion unit having an output terminal;

a logic gate having an enable signal input terminal operatively connected to said control processor, a signal input terminal operatively connected to said angular displacement sensing means and a signal output terminal commonly operatively connected to respective ones of said chip-select input terminals of the analog-to-digital conversion unit, the storage flip/flop and the angular displacement correction unit for latching said angular measurement value of the angular displacement sensing means into the storage flip/flop and said linear measurement value of the measurement sensor into the analog-to-digital conversion unit and for initiating an angular displacement correction operation in the angular displacement correction unit upon arrival of said pulse signal defining said angular measurement value;

a range comparator unit provided for the measurement sensor for responding to said output signal defining said linear measurement value of the measurement sensor when the measurement sensor enters the range of linear response and operatively connected to said chip-select input terminal of said logic gate and with the analog-to-digital conversion unit; and an adder unit provided in said control processor and operatively connected to respective ones of said output terminals of the analog-to-digital conversion unit and of the multiplier unit for performing an algebraic addition of said measurement value supplied by the analog-to-digital conversion unit and said measurement value supplied by the multiplier unit to determine a true acuate distance on the measurement-circle of the gear and to determine therefrom a circular pitch spacing of the gear.

2. The inspection machine as defined in claim 1, wherein:

said inspection machine has an inherent systematic measurement error conjointly dependent on an angular displacement and a radius of the measurement-circle of the gear; and said angular displacement correction unit being provided with a calibration-table containing values of said systematic error to permit a determination of a corrected angular displacement in relation to a systematically erroneous angular displacement defined by said angular measurement value.

3. The inspection machine as defined in claim 2, comprising:

a second transport carriage arranged between said measurement sensor and said first transport carriage for transporting the measurement sensor between an outermost retracted position of said feeler beyond the periphery of the gear and an innermost operative position of the feeler on the measurement-circle within the periphery of the gear.

4. The inspection machine as defined in claim 3, comprising:

a third transport carriage operatively associated with said first and second transport carriages for altering a measuring position of said measurement sensor in a direction substantially parallel to a central axis of the gear.

5. The inspection machine as defined in claim 1, comprising:

a second transport carriage arranged between said measurement sensor and said first transport carriage for transporting the measurement sensor between an outermost retracted position of said feeler beyond the periphery of the gear and an innermost operative position of the feeler on the measurement-circle within the periphery of the gear.

6. The inspection machine as defined in claim 5, comprising:

a third transport carriage operatively associated with said first and second transport carriages for altering a measuring position of said measurement sensor in a direction substantially parallel to a central axis of the gear.

7. An inspection method for measuring a circular pitch spacing of teeth on a measurement-circle of a gear by means of a measurement sensor having a feeler capable of being deflected by a flank of a tooth of the gear being measured and having a range of linear response and being translatable at least in a direction substantially radial to the gear and having a systematic error factor and by means of an angular displacement sensing means generating signal pulses corresponding to an angular displacement of the gear, comprising the steps of:

counting said signal pulses at least while said feeler is being deflected;

storing corresponding angular displacement measurement values;

measuring a distance corresponding to a deflection of the feeler between a point where the measurement sensor enters said range of linear response and a point attained at a time of arrival of a subsequent one of said signal pulses;

computing a value of angular displacement corresponding to one of said stored values of said angular displacement measurement values corrected by said systematic error factor to define a corrected value;

converting said corrected value into an arc-length corresponding to the angular displacement of the gear in dependency of a radius of said measurement-circle of the gear; and computing a true arc-length on the measurement-circle for determining a circular pitch spacing of the gear from said arc-length and said feeler deflection.

8. An inspection method for measuring a spacing of gear on a measurement-circle defined by a radius of a gear by means of an angular displacement sensing means for generating signal pulses corresponding to an angular displacement of the gear and having known systematic error values and by means of a linear measurement sensor having a contact feeler capable of being deflected by a flank of a tooth of the gear being measured and having a range of linear response, comprising the steps of:

inducing said angular displacement of the gear;

counting said signal pulses during said angular displacement;

storing counted values of the signal pulses corresponding to angular positions of the gear;

measuring a distance corresponding to a deflection of said feeler from a prescribed position of the feeler to a position attained by the feeler when a subsequent one of the signal pulses is counted;

defining at least two corrected angular positions of the gear from said stored counted values by algebraically adding corresponding ones of said known systematic error values of said angular displacement sensing means thereto;

defining at least one value of angular displacement of the gear from said at least two corrected angular positions of the gear;

defining a first arc-length from said value of angular displacement of the gear and said radius of the measuring-circle of the gear; and defining a true arc-length on the measuring-circle of the gear by algebraically adding said distance to said first arc-length for determining said spacing of gear teeth.

* * * * *